United States Patent
Yanover et al.

(10) Patent No.: US 9,148,838 B2
(45) Date of Patent: Sep. 29, 2015

(54) METHOD AND APPARATUS FOR LOAD MANAGEMENT IN CELLULAR COMMUNICATION NETWORKS

(71) Applicant: Intucell Ltd., Ra'anana (IL)

(72) Inventors: Vladimir Yanover, Kfar-Saba (IL); Ziv Nuss, Tsur Yigal (IL)

(73) Assignee: INTUCELL LTD., Ra'anana (IL)

( * ) Notice: Subject to any disclaimer, the term of this patent is extended or adjusted under 35 U.S.C. 154(b) by 0 days.

(21) Appl. No.: 14/187,009

(22) Filed: Feb. 21, 2014

(65) Prior Publication Data
US 2014/0242991 A1 Aug. 28, 2014

(30) Foreign Application Priority Data
Feb. 24, 2013 (IL) .......................................... 224878

(51) Int. Cl.
*H04W 36/22* (2009.01)

(52) U.S. Cl.
CPC ..................................... *H04W 36/22* (2013.01)

(58) Field of Classification Search
CPC combination set(s) only.
See application file for complete search history.

(56) References Cited

U.S. PATENT DOCUMENTS

2012/0282964 A1* 11/2012 Xiao et al. .................... 455/515
2014/0328277 A1* 11/2014 Xiao et al. .................... 370/329

OTHER PUBLICATIONS

"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.

* cited by examiner

*Primary Examiner* — Diane Mizrahi
(74) *Attorney, Agent, or Firm* — Patent Capital Group (57) ABSTRACT

One example method for reducing load is provided that includes monitoring traffic load within at least two wireless cells by a central management entity associated with the cellular communication network; determining by the central management entity that at least one of the at least two wireless cells being monitored, should hand over at least one of the mobile devices being currently serviced by a base station associated with that at least one cell; determining by the central management entity to which of the other cells from among the at least two wireless cells being monitored, should the at least one of the mobile devices be handed over to; and notifying each of the base stations associated with the other cells from among the at least two wireless cells being monitored, to affect a change in their respective one or more operating parameters.

20 Claims, 3 Drawing Sheets

METHOD AND APPARATUS FOR LOAD MANAGEMENT IN CELLULAR COMMUNICATION NETWORKS

CROSS-REFERENCE TO RELATED APPLICATIONS

This application is based on and claims the benefit of priority under 35 U.S.C. §119 from Israeli Patent Application No. 224878 filed in the Israel Patent Office on Feb. 24, 2013, entitled "METHOD AND APPARATUS FOR LOAD MANAGEMENT IN CELLULAR COMMUNICATION NETWORKS," the contents of which are hereby incorporated by reference in their entirety.

TECHNICAL FIELD

The disclosure relates to a system and a method for managing wireless networks, and in particularly to load management of heterogeneous cellular networks.

BACKGROUND

In mobile telecommunications, the term handover or handoff refers to the process of transferring an ongoing call or data session from one channel connected to the core network to another. There may be different reasons why a handover might be required in mobile telecommunications networks, among which re for example, when the mobile device is moving away from the area covered by one cell and entering the area covered by another cell, in which case the call is transferred to the second cell in order to avoid call termination when the mobile device leaves the range of the first cell;

when the capacity for connecting new calls of a given cell is used up (i.e. the cell becomes overloaded) and an existing or new call from a mobile device, which is located in an area overlapped by another cell, is transferred to that cell in order to free-up some capacity in the first cell for other users, who can only be connected to that cell;

in non-CDMA networks when the channel used by the mobile device becomes interfered by another mobile device using the same channel in a different cell, the call is transferred to a different channel in the same cell or to a different channel in another cell in order to avoid the interference;

when the user behavior changes in non-CDMA networks, e.g. when a fast-travelling user, connected to a large, umbrella-type of cell, stops then the call may be transferred to a smaller macro cell or even to a micro cell in order to free capacity on the umbrella cell for other fast-traveling users and to reduce the potential interference to other cells or users;

The most basic form of handover is when a communication session, to which the mobile device is part, is redirected from its current cell (referred to as "source cell") to a new cell (referred to as "target cell"). The purpose of such handover is to maintain the call as the subscriber is moving out of the area covered by the source cell and entering the area of the target cell.

For practical implementations of handoffs in a cellular network, each cell is assigned with a list of potential target cells, which can be used for handing-off calls from this source cell to these potential target cells, called neighbors whereas the list is called neighbor list. Creating such a list for a given cell is not trivial and different algorithms may be applied to input data retrieved from field measurements or computer predictions of radio wave propagation in the areas covered by the cells.

Typically, during a communication session one or more parameters of the signal in the channel in the source cell are monitored and assessed in order to decide when a handover may be required. The downlink (forward link) and/or uplink (reverse link) directions may be monitored. The handover may be initiated by the mobile device or by the base station (BTS)/by an E-UTRAN Node B ("eNB") in the LTE Standard, of its source cell and, in some systems, by a BTS of a neighboring cell. The mobile device and the BTSs of the neighboring cells monitor each other signals and the best target candidates are selected by the BS of the source cell from among the neighboring cells.

This need to hand over mobile devices from one cell to another has been increased in the recent years as wireless networks operators have started to deploy their own or rely on end users to buy very small Base Stations, in order to meet the increasing demand for data traffic. This new type of cell sites, referred to herein below as "small cells" or "metro cells", used in conjunction with wireless cells of the traditional cellular networks (macro cells). Networks that include both macro cells and metrocells are referred to herein as heterogeneous networks (HetNets).

The term "small cells" as used herein and throughout the specification and claims encompass femtocells, picocells microcells and metrocells. Small-cell networks can also be realized by means of distributed radio technology consisting of centralized baseband units and remote radio heads. A common factor in all these approaches to small cells is that they are centrally managed by mobile network operators.

In analog systems, the parameters used as criteria for requesting a handover are usually the Received Signal Strength Indicator ("RSSI") and the received Signal-to-noise ratio ("SNR"). In non-CDMA 2G digital systems the criteria for requesting handover may be based on estimates of the received signal power, bit error rate (BER) and block error/erasure rate (BLER), received quality of speech (RxQual), distance between the mobile device and the BTS (estimated from the radio signal propagation delay) and others. In CDMA systems, 2G and 3G, the most common criterion for requesting a handover is Ec/Io ratio measured in the pilot channel (CPICH) and/or RSCP.

Figure 1:
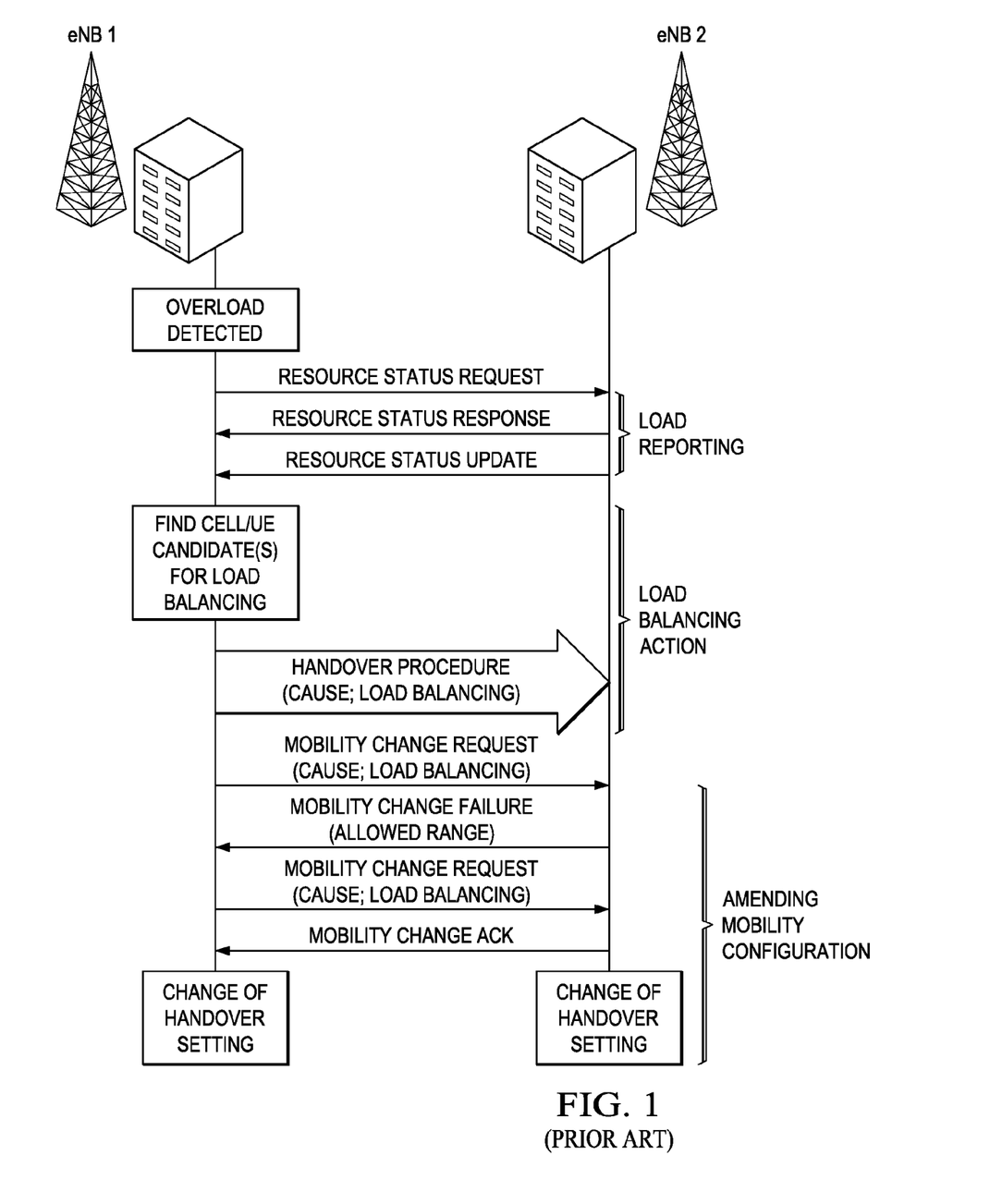
FIG. 1—is an illustration of a part of a prior art process for affecting load balancing in LTE systems.

Section 8.3.8 of ETSI's "LTE: Evolved Universal Terrestrial Radio Access Network (E-UTRAN); X2 Application Protocol (X2AP) (3GPP TS 36.423 version 9.4.0 release 9)" relates to mobility setting change which enables an eNB to negotiate the handover trigger settings with a peer eNB controlling neighboring cell, or in other words, the goal of the procedure is to renegotiate the mobility settings of target cell $eNB_2$ when offloading UEs from the source cell, $eNB_1$, to the target cell, $eNB_2$. The procedure uses non UE-associated signaling, in which $eNB_1$ sends a MOBILITY CHANGE REQUEST to its neighbor $eNB_2$ and if that request is accepted by $eNB_2$, the latter responds by returning a MOBILITY CHANGE ACKNOWLEDGE to $eNB_1$. An example of such a process is illustrated in FIG. 1.

However, there is still an inherent problem associated with such a method for carrying out the handoff procedure, when some of the mobile devices which have just been handed over from $eNB_1$ to $eNB_2$ are immediately thereafter pushed back by the $eNB_2$ to eNB1, and vice versa.

According to above-mentioned procedure, the eNB of the overloaded cell determines that it needs to handover some of the mobile devices, which it serves to its neighbors in order to reduce its load. As illustrated in FIG. 1, the eNB sends a MOBILITY CHANGE REQUEST to one or more of its neighbors identifying a change that is required in the neighbors' operating conditions, a change which will enable handing over the mobile devices as determined. Each of the neighbors that are approached by the eNB sends either a confirmation or a rejection to that request. If the eNB receives a rejection it will re-negotiate with that neighbor a different change (a smaller change), which hopefully will be acceptable to that neighbor and still will ease the situation for the originating eNB. This is a complex and resource consuming process, which still does not necessarily result in an optimized operation. There are several possible reasons for this drawback, for example:

Fast connection (e.g. X2 link) does not necessarily exist between neighbor eNBs; and The process performance strongly depends on particular details of the load balancing algorithms, which are implemented at both $eNB_1$ and $eNB_2$. When both eNBs are produced by the same vendor, these details are synchronized with each other, however this not the case if they are both produced by different vendors.

SUMMARY OF THE DISCLOSURE

The disclosure may be summarized by referring to the appended claims.

It is an object of the present disclosure to provide a method and apparatus to enable increased data traffic offload in order to avoid overload at certain cells of a cellular network.

It is another object of the present disclosure to provide a method and apparatus to enable dynamic offloading of mobile devices to neighboring cells in a HetNet.

It is yet another object of the present disclosure to provide a method and apparatus to enable dynamic balancing of the load between different cells of a wireless network.

It is still another object of the present disclosure to provide a method and apparatus that will prevent mobile devices from being handed over back and forth to two neighboring cells.

Other objects of the present disclosure will become apparent from the following description.

According to a first embodiment there is provided a method for reducing load in a cellular communication network, the method comprises the steps of:

(a) monitoring traffic load within the at least two wireless cells by a central management entity;

(b) determining by the central management entity that at least one of the at least two wireless cells being monitored, should hand over at least one of the mobile devices being currently serviced by a base station associated with that at least one cell;

(c) determining by the central management entity to which of the other cells from among the at least two wireless cells being monitored, should the at least one of the mobile devices be handed over to;

(d) notifying each of the base stations associated with the other cells from among the at least two wireless cells being monitored, to affect a change in their respective operating parameters, and what is the change that should be affected by each of the base stations; and (e) in case any of the receiving base stations determines that the notified change is unacceptable, a negotiation procedure with the central management entity is initiated in order to determine a change in that base station operating parameters that will be actually affected, in order to enable the at least one mobile device to be handed over thereto.

As will be appreciated by those skilled in the art, the central management entity would not typically cause that one specific mobile device will be handed over from one base station to another, but typically, when carrying out steps (b) and (c) mentioned above, the central management entity enables the handover of a group of certain mobile devices from one cell to the other, if their operating parameters match those new ones which are currently characterized the target base station after having affected the change as negotiated with the central management entity. For example, "UEs connected to the cell A and having RSSI/SINR less than X should move to the cell B."

The term "base station" (BS) as used herein throughout the specification and claims should be understood as a communication entity that contains equipment for transmitting and receiving radio signals (transceivers), antennas. Typically, a BS for anything other than a picocell will have several transceivers (TRXs) which allow it to serve several different frequencies and/or different sectors of the cell (in the case of sectorised base stations). This term should be understood to encompass eNB for example if the cellular network is compatible with the LTE Recommendation.

According to another embodiment, the method further comprises a step wherein in response to affecting the agreed upon change by each of the base stations, a handover procedure is triggered, following which the at least one mobile device will be serviced by a base station associated with the wireless cell to which that respective at least one mobile device was handed over.

In accordance with another embodiment, the method further comprising a step by which after completing the negotiation (i.e. an agreement has been reached) between the central managing entity and each of the base stations to which the mobile devices will be handed over, the central managing entity notifies the at least one base station that is about to offload one or more mobile devices, which is the at least one base station to which the one or more mobile devices will be handed over.

According to yet another embodiment, the notification sent by the central managing entity to the at least one base station that is about to offload one or more mobile devices further comprises a notification of a change to be affected by that at least one station in its operating parameters. This latter part of the notification may be used to ensure that the one or more mobile devices will not be returned from the at least one base station to which the one or more mobile devices were handed over, back to the at least one base station from which the one or more mobile devices were just offloaded.

By still another embodiment, following the receipt of the notification conveyed by the central management entity to the at least one base station which is about to offload at least one mobile device, the at least one base station initiates a handover procedure to a target base station according to that notification.

According to another embodiment, a set of one or more operating parameters being notified by the central management entity to one or more of the base stations includes threshold values for RSSI and/or SNR of the signal from the serving BS and from particular neighbor BS as measured by the mobiles devices. In the alternative, it may be RSSI and/or SNR offset which is specific to a particular neighbor cell, to be used for comparing signals received by the UE from the serving base station and from the neighbor base station. Once the base stations adopt their set of operating parameters to the value(s) determined by the central managing entity, they in fact determine which of the at least one mobile device will be handed over and to which of the other wireless cells will it be handed over, i.e. to which of the mobile devices, does the new set of operating parameters, as implemented by a potential target base station, allow to carry out the handover procedure so as to be serviced by that potential target base station.

According to another embodiment, the set of operating parameters notified by the central management entity to at least one of the base stations is different from the set of operating parameters notified by the central management entity to at least one of the other base stations (e.g. two different base stations may receive two different SNR or RSSI thresholds from the central managing entity).

In accordance with another embodiment, the cellular communication network is a heterogeneous cellular network ("HetNet") comprising a plurality of small cells.

According to another aspect there is provided a communication apparatus (e.g. a server) operative as a centralized management entity and adapted to reduce load in at least one cell of a cellular communication network, the communication apparatus comprises:
 (a) one or more receivers operative to receive information regarding current traffic load at least two wireless cells of the cellular communication network;
 (b) one or more processors operative to:
  (b1) determine that at least one of the mobile devices being currently serviced by a base station associated with at wireless cell of the at least two wireless cells, should be handed over to be serviced by another base station associated with another wireless cell from among the at least two wireless cells;
  (b2) determine to which of the other wireless cells from among the at least two wireless cells, should the at least one of the mobile devices be handed over to;
  (b3) generate a message for each of the base stations associated with the other cells wireless from among the at least two wireless cells, identifying a change that should be affected in their respective operating parameters; and
  (b4) carrying out a negotiation procedure in order to determine an actual change that will be affected in the operating parameters of each of the base stations receiving the message, in case the receiving base station determines that the change specified in the message is unacceptable; and
 (c) one or more transmitters operate to convey each of the messages generated by said one or more processors, towards the respective base stations.

The communication apparatus, being a centralized managing entity (e.g. a centralized self organizing network, "cSON", entity) which may be connected either to a management system of the cellular network and/or to a management system a plurality of small cells, thereby enabling a managing entity (e.g. the cSON) to retrieve and provide information from the management system it is connected to and/or in a synchronized manner from both systems if it is connected indeed to both.

In accordance with another embodiment, the one or more processors are further operative to generate a message to be conveyed to the at least one base station that is about to offload one or more mobile devices, identifying which is the at least one base station to which the one or more mobile devices will be handed over.

According to yet another embodiment, the message generated by the one or more processors to be conveyed to the at least one base station that is about to offload one or more mobile devices further comprises information that relates to a change to be affected by that at least one station in its operating parameters.

According to another embodiment of this aspect, the change comprised in the message generated by the one or more processors, is a change that relates to one or more operating parameters of the base station for which the respective message is intended, so that by affecting that change, the at least one mobile device which will be handed over is directly or indirectly determined as well as to which of the other wireless cells it will be handed over.

By still another embodiment of this aspect, the required change comprised in one message generated by the one or more processors and which will be conveyed to at least one of the base stations, is different from the required change comprised in another message generated by the one or more processors and which will be conveyed to at least one other of the base stations.

By still another embodiment, the communication apparatus is adapted to operate in a heterogeneous cellular network ("HetNet") comprising a plurality of small cells.

According to another aspect there is provided a non-transitory computer-readable storage media storing one or more sequences of instructions which when executed cause one or more processors located within a central managing entity of a cellular network to perform:
 (a) monitoring traffic load within the at least two wireless cells of the cellular communication network;
 (b) determining that at least one of the at least two wireless cells being monitored, should hand over at least one of the mobile devices being currently serviced by a base station associated with that at least one cell;
 (c) determining to which of the other cells from among the at least two wireless cells being monitored, should the at least one of the mobile devices be handed over to;
 (d) generating a message to notify each of the base stations associated with the other wireless cells from among the at least two wireless cells being monitored, to affect a change in their respective operating parameters, as well as what is the change that should be affected by each of the base stations; and (e) in case any of the receiving base stations determines that the notified change is unacceptable, carrying out a negotiation procedure with that receiving base station in order to determine a change in the latter operating parameters, that would be affected.

Other aspects of the present disclosure such as certain features of a communication system, which is adapted to operate in accordance with the principles of the method described hereinabove, mutatis mutandis, are encompassed within the scope of the present disclosure.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present disclosure by way of examples. It should be apparent, however, that the present disclosure may be practiced without these specific details.

In current cellular systems, there is a need to optimize network performance in accordance with a number of variables, one of which is the network load. The present disclosure provides a solution for load balancing of traffic between cells of the radio network. The target of the load balancing function is to improve the efficiency of the radio resources deployed in each cell of the cellular system, whether it is a small cell or more importantly if it is a macro cell, thereby allowing postponing of further CAPEX and OPEX investments that would have been incurred by the operator if new radio equipment is required to support the traffic growth.

The efficiency of the load balancing application depends greatly on the speed of identifying when a load is being developed at each cell, and consequently, adjusting network settings in an appropriate and efficient manner to accommodate that process.

At present, when a specific Node B (base station), say $eNB_1$ determines that it is overloaded or is about to become overloaded, it may initiate a process for reducing its traffic load. In accordance with this process (part of which is exemplified in FIG. 1), $eNB_1$ sends a request to one or more of its neighbors to modify their operating parameters in order to effectively expand their cell coverage area so that some of the mobile subscribers currently being in communication with $eNB_1$ will be able to communicate via the one or more neighboring cells. The $eNB_1$ does that for example by suggesting a change in the SNR and/or RSSI thresholds or offsets to be affected by $eNB_2$. Changing the operating parameters (e.g. thresholds) means that more of the mobile subscribers currently connected to $eNB_1$ can be handed over to $eNB_2$. The process further includes a step to avoid a ping pong effect after handover to $eNB_2$ However, if the suggested change is not acceptable for $eNB_2$, it returns a failure message that rejects the change as suggested by $eNB_1$, and may suggest a different parameters values instead, that would be suitable for its current configuration. However, this approach, which has been adopted by the 3GPP in TS 36.423 version 9.4.0 release 9 Standard, suffers from inherent drawbacks, such as the following ones.

1) The solution provided by the 3GPP Specifications is based upon communications between eNBs over so called X2 interface. Such interface is not necessarily available for enabling communications between each pair of neighboring eNBs, and even if available, it is not necessarily enabled when required.
2) Performance of the 3GPP solution strongly depends upon details of the algorithm(s) implemented by both neighbors, $eNB_1$ and $eNB_2$, especially upon the decisions taken by these two eNBs; for example, the both may try at the same time to offload mobile devices, which each of them serves to the other one. These algorithms are not standardized and probably will never be. Therefore, the service provider cannot rely on them in a multi-vendor deployment. On the other hand, with the cSON as proposed by the present solution, there is only one network node making all the decisions, so no multi-vendor problem could arise due to lack of compatibility between the algorithms;
3) In order to allow such offloading as described above through the network, each overloaded eNB according to the 3GPP Recommendation should start negotiating the change that will eventually be affected by its neighbor(s), on a "per neighbor" basis. When taking into account the time and resources (e.g. bandwidth) required to carry out this process by one eNB by the number of eNBs that reach simultaneously overload condition, this process is far from being satisfactory.
4) Also, even if the eNBs were to initiate this process, say every pre-determined period of time so that when an eNB becomes overloaded it already has the information of the load status of its neighbors, still, such a solution will consume unacceptable portion of the network resources.

A radio access network ("RAN") is part of a cellular telecommunication system. It resides between devices such as mobile phones, computers etc. and provides connection with its core network ("CN"). Typically, it comprises a plurality of macro wireless cells serviced by their respective base stations and a management system that takes care after the proper function of the network (e.g. assignment of radio channels, transmission power, parameters affecting cell reselection, handovers, etc.).

Figure 2:
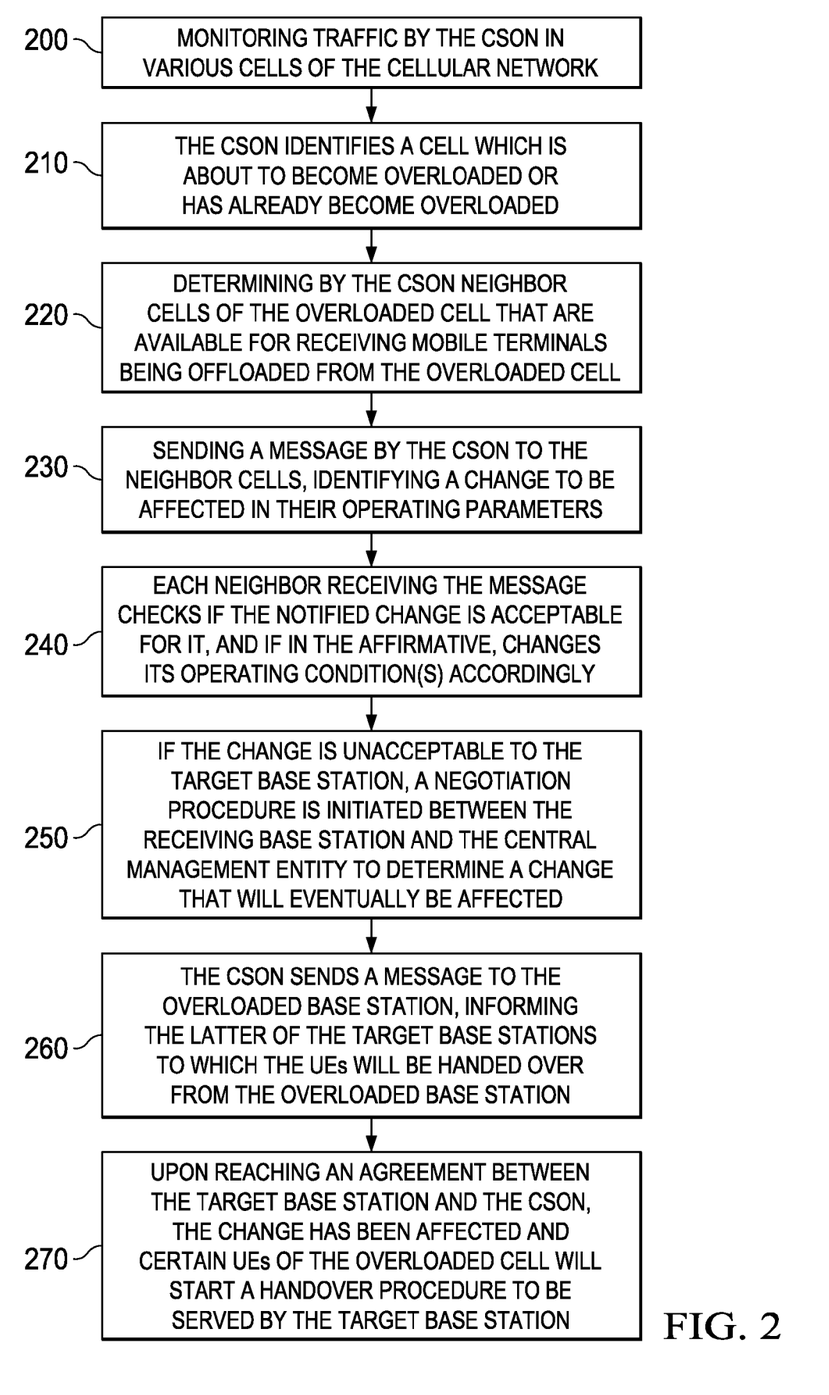
FIG. 2—presents a schematic block diagram of a method for carrying out an embodiment of the present disclosure.

Let us turn now to FIG. 2 which illustrates a typical cellular network architecture 100 that includes a core network ("CN") 110, a radio access network ("RAN") 120 and their related interface (Iu interface) 130, as well as the operations and support system 140 and its interface with the CN and the RAN. The communication apparatus (e.g. a computing platform) of the present system is represented by the Centralized Self Optimization Network (CSON) node 150 shown in this Fig.

Figure 3:
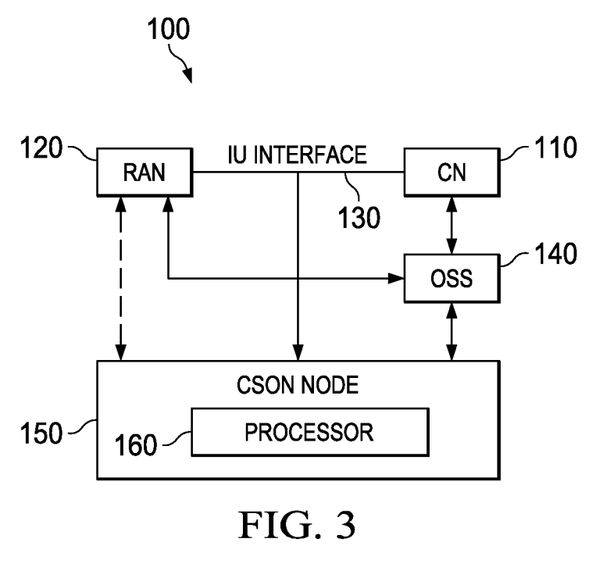
FIG. 3—illustrates implementation of a CSON (Centralized Self Optimization Network) system into a typical cellular network architecture including the main inputs and outputs from the cSON system.

As can be seen in FIG. 3, the CSON node 150 is connected to the OSS 140 in a bidirectional connection. The CSON node 150 is operative to provide commands to the OSS for CM (Configuration Management) of the cellular system NEs (Network Elements), and to retrieve performance management information from the OSS.

The CSON builds a real time (or near real time) visibility of the load state in the UTRAN (step 200), and is provided with the neighbors' relations between macro cells themselves and between macro cells and small cells (the latter information may be received for example based on information sent from the macro cells to the CSON).

Once the CSON identifies that a cell is about to become overloaded or has already become overloaded (step 210), it reviews the status of the neighbors of that cell in order to determine whether the overload situation at that cell may be eased by offloading some of the mobile device currently operative in that cell, to one or more of its neighbors. After having determined that there is one or more neighboring cells available for the offloading (step 220), the CSON may preferably determine the amount of traffic that can be re-directed via (offloaded to) each of the neighboring cells, while ensuring that neither one of the cells to which the mobile devices are about to be offloaded, will not become overloaded itself. According to this example, the CSON may further determine that a different amount of traffic may be re-directed to one or more cells from among the available neighbors, in order to ensure that none of these cells becomes overloaded.

Next, the CSON sends a message to one or more of the neighboring cells which were determined to be available for offloading one or more mobile devices from their overloaded source cell, and in that message, the CSON identifies a change to be affected in one or more of the operating parameters of the neighboring cell(s) receiving the message while ensuring that this change will not result in a ping pong effect (i.e. when a mobile device that has just been handed over to a target base station is pushed back to the source base station) (step 230). Such a change may be for example a change in certain base stations' operating parameters, such as threshold values for RSSI or SNR of the signal from the serving (source) BS and from particular neighbor BS as measured by mobiles, it can be RSSI or SNR offset specific to particular neighbor cell, to be used in comparison of signals received by the UE from the serving base station and from the neighbor base station, and the like.

In response to receiving the message(s) sent by the CSON, each base station of the available neighboring cells checks if that change is acceptable for it (step 240), and if in the affirmative, it affects the change identified by the message it had received. However, if the change is found unacceptable by a receiving base station (e.g. the current traffic load has increased dramatically in the last few minutes, and the central management entity has not yet been updated accordingly), a negotiation procedure will be initiated between that receiving base station and the central management entity to determine a change that will eventually be affected (step 250). For example, the receiving base station would send a failure message to the central management entity followed by an indication of its available resources, such as the maximum change possible of its operating parameter(s). Thereafter, the central management entity may confirm the proposal of the receiving base station, reject it, or propose another change (e.g. another value of the same operating parameter, a change in another operating parameter, etc.).

Upon reaching an agreement on the change to be affected between the receiving base station(s) and the central managing entity, the latter may send a message to the base station from which the UEs should be offloaded, identifying the base station to which these UEs will be handed over (step 260).

Once the change has been affected, certain UEs that are currently in communication via the overloaded cell are handed over to the target neighboring cell that had affected the change as required by the CSON (step 270).

Figure 4:
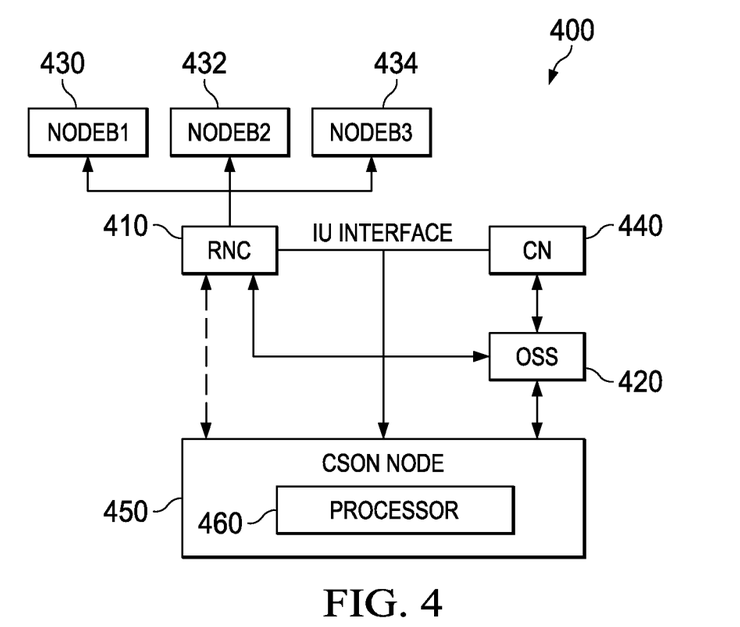
FIG. 4—illustrates implementation of the present system into a typical cellular UMTS network architecture showing the radio network controller and nodes of the radio access network.

FIG. 4 illustrates an example of an embodiment by which the CSON collects the information that relates to the traffic load of the various wireless cells. UMTS cellular network 400 includes a Radio Network Controller (RNC) 410, Operations and Support System (OSS) 420, a plurality of NodeB's 430, 432 and 434 as well as the Core Network (CN) 440 and Centralized SON server 450. The CSON comprising a processor 460 adapted to receive the probed information from the Iu interface, which interconnects the RAN and the CN, but it can also utilize any RAN or CN interface for the general case.

In addition to interface probing, the CSON server also gets OSS information, such as PM files, as well as RNC traces, either directly from the NodeB itself, or via the OSS platform.

The system may probe the Iu interface for information such as Initial UE Messages and/or Location Reports, which can be related to a certain cell. It then builds a learning function (prediction) that will determine, e.g. based on trends of certain indicators, what is the load that is being developed upon the radio resources, and if that load justifies activating the load balancing functionality described above.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present disclosure has been described using detailed descriptions of embodiments thereof that are provided by way of example and are not intended to limit the scope of the disclosure in any way. The described embodiments comprise different features, not all of which are required in all embodiments of the disclosure. Some embodiments of the present disclosure utilize only some of the features or possible combinations of the features. Variations of embodiments of the present disclosure that are described and embodiments of the present disclosure comprising different combinations of features noted in the described embodiments will occur to persons of the art. The scope of the disclosure is limited only by the following claims.

The invention claimed is:

1. A method for reducing load in a cellular communication network, the method comprising:
   (a) monitoring traffic load within at least two wireless cells by a central management entity associated with the cellular communication network;
   (b) determining by the central management entity that at least one wireless cell of the at least two wireless cells being monitored, should hand over at least one mobile device of one or more mobile devices being currently serviced by at least one base station associated with that at least one wireless cell;
   (c) determining by the central management entity to which of the other wireless cells from among the at least two wireless cells being monitored, should the at least one mobile device of the one or more mobile devices be handed over to; and
   (d) generating, for each of one or more base stations associated with the other wireless cells from the at least two wireless cells being monitor, a first message to notify each of the one or more base stations associated with the other wireless cells from among the at least two wireless cells being monitored to affect a change in their respective one or more operating parameters and what is the change that should be affected by each of the one or more notified base stations; and
   (e) in case any of the one or more notified base stations determines that the notified change is unacceptable, initiating a negotiation procedure with the central management entity to determine a change in one or more operating parameters that will be actually affected for any notified base station that determines the notified change is unacceptable.

2. The method of claim 1, wherein in response to affecting an agreed upon change by each of the one or more notified base stations, triggering a handover procedure, following which the at least one mobile device of the one or more mobile devices will be serviced by a target base station associated with a particular wireless cell to which that respective at least one mobile device of the one or more mobile devices was handed over.

3. The method of claim 1, wherein after completing the negotiation between said central managing entity and each of the one or more notified base stations to which the at least one mobile device of the one or more mobile devices will be handed over, the central managing entity generating a second message to notify the at least one base station that is about to offload the at least one mobile device of the one or more mobile devices which at least one notified base station of the one or more notified base stations will be the at least one notified base station to which the at least one mobile device of the one or more mobile devices will be handed over.

4. The method of claim 3, wherein the notification included in the second message sent by the central managing entity to the at least one base station that is about to offload the at least one mobile device of the one or more mobile devices further comprises a notification of a change in one or more operating parameters that are to be affected by that at least one notified base station.

5. The method of claim 3, wherein following receipt of the notification included in the second message conveyed by the central management entity to the at least one base station which is about to offload at least one mobile device, the at least one base station initiates a handover procedure to a target base station according to that notification.

6. The method of claim 1, wherein the one or more operating parameters being notified by the central management entity to one or more of the notified base stations include, at least in part, Signal-to-Noise Ratio (SNR) and/or Received Signal Strength Indicator (RSSI) thresholds and/or offsets, thereby establishing which of the at least one mobile device of the one or more mobile devices will be handed over and to which of the other wireless cells will it be handed over.

7. The method of claim 1, wherein one particular operating parameter being notified by the central management entity to at least one notified base station of the one or more notified base stations is different from another particular operating parameter being notified by the central management entity to at least one other notified base station of the one or more notified base stations.

8. The method of claim 1, wherein the one or more operating parameters being notified by the central management entity to one or more of the notified base stations include at least one of: a Signal-to-Noise Ratio (SNR) and Received Signal Strength Indicator threshold or offset based, at least in part on reports transmitted by the one or more mobile devices which comprise at least one of: SNR and RSSI measurements taken by the one or more mobile devices.

9. The method of claim 1, wherein the cellular communication network is a heterogeneous cellular network ("HetNet") comprising a plurality of small cells.

10. A communication apparatus operative to reduce load in at least one cell of a cellular communication network, the communication apparatus comprises:
   (a) one or more receivers that operate to receive information regarding current traffic load at least two wireless cells of the cellular communication network;
   (b) one or more processors that operate to:
       (b1) determine that at least one mobile device of one or more mobile devices being currently serviced by at least one base station associated with at least one wireless cell of the at least two wireless cells, should be handed over to be serviced by another base station associated with another wireless cell from among the at least two wireless cells;
       (b2) determine to which of the other wireless cells from among the at least two wireless cells, should the at least one mobile device of the one or more mobile devices be handed over to; and
       (b3) generate a first message for each of one or more base stations associated with the other wireless cells from among the at least two wireless cells, the first message identifying a change that should be affected in their respective operating parameters; and
       (b4) carrying out a negotiation procedure in order to determine an actual change that will be affected in the operating parameters of each of the one or more base stations receiving the first message, in case any base station receiving the first message determines that the change identified in the first message is unacceptable; and
   (c) one or more transmitters that operate to convey each of the first messages generated by said one or more processors, towards respective base stations associated with the other wireless cells from among the at least two wireless cells.

11. The communication apparatus of claim 10, wherein said one or more processors further operate to generate a second message to be conveyed to the at least one base station that is about to offload the at least one mobile device of the one or more mobile devices, the second message identifying at least one particular base station of the one or more base stations receiving the first message to which the at least one mobile device of the one or more mobile devices will be handed over.

12. The communication apparatus of claim 11, wherein the second message generated by the one or more processors which is to be conveyed to the at least one base station that is about to offload the at least one mobile device of the one or more mobile devices, further comprises information that relates to a change in one or more operating parameters that are to be affected by that at least one particular base station.

13. The communication apparatus of claim 10, wherein the change comprised in the first message generated by the one or more processors is a change in Signal-to-Noise Ratio (SNR) and/or Received Signal Strength Indicator (RSSI) thresholds and/or offsets of the one or more base stations for which the message has been generated, so that by affecting said change, said change affects which of the at least one mobile device of the one or more mobile devices will be handed over and to which of the other wireless cells will it be handed over.

14. The communication apparatus of claim 10, wherein a required change comprised in one particular first message conveyed to at least one particular base station is different from another required change comprised in another particular first message conveyed to at least one other particular base station.

15. The communication apparatus of claim 10, wherein the cellular communication network is a heterogeneous cellular network ("HetNet") comprising a plurality of small cells.

16. A non-transitory computer-readable storage media storing one or more sequences of instructions which when executed cause one or more processors of a central managing entity located in a cellular communication network to perform:
   (a) monitoring traffic load within the at least two wireless cells of the cellular communication network;
   (b) determining that at least one wireless cell of the at least two wireless cells being monitored should hand over at least one mobile device of one or more mobile devices being currently serviced by a base station associated with that at least one cell;
   (c) determining to which of the other wireless cells from among the at least two wireless cells being monitored, should the at least one mobile device of the one or more mobile devices be handed over to;
   (d) generating a first message to notify each of one or more base stations associated with the other wireless cells from among the at least two wireless cells being monitored to affect a change in their respective operating parameters as well as what is the change that should be affected by each of the one or more notified base stations; and
   (e) carrying out a negotiation procedure with any of the one or more notified base stations that determine that the notified change is unacceptable to determine a change in one or more operating parameters that would be affected for any of the one or more notified base stations that determine that the notified change is unacceptable.

17. The media of claim 16, wherein in response to affecting an agreed upon change by each of the one or more notified base stations, a handover procedure is triggered, following which the at least one mobile device of the one or more mobile devices will be serviced by a target base station associated with the wireless cell to which that respective at least one mobile device of the one or more mobile devices was handed over.

18. The media of claim 16, wherein after completing the negotiation, the central managing entity notifies the at least one base station that is about to offload the at least one mobile device of the one or more mobile devices, which at least one notified base station of the one or more notified base stations will be the at least one notified base station to which the at least one mobile device of the one or more mobile devices will be handed over.

19. The media of claim 18, wherein the notification sent by the central managing entity to the at least one base station that is about to offload the at least one mobile device of the one or more mobile devices further comprises a notification of a change in one or more operating parameters that are to be affected by that at least one notified base station.

20. The media of claim 18, wherein following receipt of the notification conveyed by the central management entity to the at least one base station which is about to offload the at least one mobile device of the one or more mobile devices, the at least one base station initiates a handover procedure to a target base station according to that notification.

\* \* \* \* \*